May 31, 1927. 1,631,008
E. M. CHAPPELL
PLOW STOCK
Filed Jan. 24, 1925
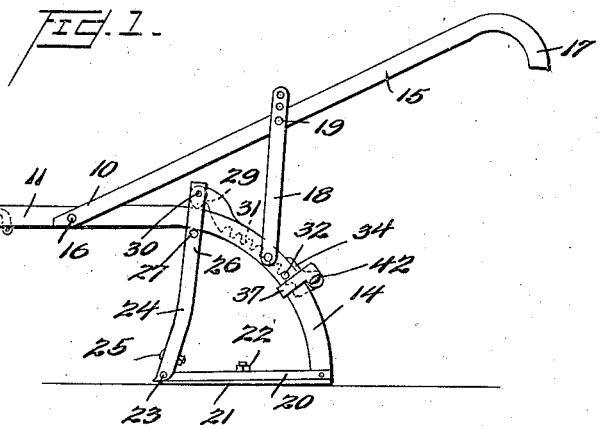

Patented May 31, 1927.

1,631,008

UNITED STATES PATENT OFFICE.

ELBERT M. CHAPPELL, OF HARTSVILLE, SOUTH CAROLINA, ASSIGNOR TO HARTSVILLE MANUFACTURING COMPANY, OF HARTSVILLE, SOUTH CAROLINA, A CORPORATION OF SOUTH CAROLINA.

PLOW STOCK.

Application filed January 24, 1925. Serial No. 4,463.

This invention relates to agricultural implements and more particularly to adjustable plow stocks.

It is a general object of this invention to provide a novel and improved form of adjustable plow stock.

More particularly, it is an object of this invention to provide a novel and improved method of and means for adjusting the angle of the plow share or blade in relation to the plow beam.

Another object of the invention consists in the provision of a novel, self-locking, adjustment mechanism for plows which can readily and rapidly be adjusted without the use of tools and yet which will maintain its adjustment under all conditions of working, which is simpler to construct than the usual adjustments, which has no parts to be lost and which will retain the plow blade positively and solidly in an adjusted position.

In the following specification and accompanying drawings there is disclosed by way of example, only, a single embodiment of the present invention with the understanding, however, that various changes and modifications may be made in the arrangement, form, material, size and proportion of the various parts by those skilled in the art without departing from the spirit of the invention as set forth in the accompanying claims.

In said drawings:

Fig. 1 is a side elevation of a plow constructed according to this invention;

Fig. 2 is a side elevation of the rear portion thereof on an enlarged scale showing one of the beams partially broken away;

Fig. 3 is a transverse section on line 3—3 of Figure 2;

Fig. 4 is a partial plan view showing the adjusting member in locking position; and Fig. 5 is a section on line 5—5 of Figure 2 looking in the direction of the arrows.

When plowing in various kinds of soil and particularly when cultivating between the rows of various kinds of plants in truck gardens, general field crops and the like, it is found desirable to be able to adjust the angle of the plow blade in respect to the surface of the soil in order that various shaped furrows and hills may be made and also to assist in maintaining even depth regulation without excessive energy on the part of operator to control this regulation by means of handles, thus making the plowing operation easier. In order that this may be readily done, the present invention contemplates providing a simple, quick and easy means of adjusting this angle without the use of tools.

Referring to the drawings, there is disclosed generally at 10 a common form of plow or cultivator including the pair of spaced parallel metal beams 11 formed of thin metal bars, rectangular in cross-section and spaced apart, a distance substantially equivalent to their thickness. To the forward end of these beams is attached any suitable form of mechanism to enable the plow to be connected to a suitable type of motive power. Conveniently, the adjustable hitch mechanism forming the subject matter of my copending application Serial No. 758,678, filed December 29, 1924, may be used.

The rear ends of the beams are curved downwardly to form the quadrants 14 and a pair of handles 15 of any well-known form are attached at 16 between the arcuate portions 14 and the hitch member 13 and extend upwardly, rearwardly and divergently and are provided with the curved ends or grips 17. The handles 15 may be supported by braces 18 extending upwardly and divergently from the arcuate portions 14 of the beams and may, if desired, have an adjustable connection as at 19 with the handles.

The lower ends of the arcuate or quadrant portions of the beams 11 have rigidly secured to them the forwardly projecting bars 20 to which may be secured the adjustable and replaceable slide plate 21 by means of the bolt 22. This slide plate rides along the ground at the bottom of the furrow and supports the plow. To the forward ends of these bars 20 are pivoted, by means of the transverse pin 23, the adjustable upright standards 24 which are adapted to carry the plow blade or any form of cultivator blade or shape such as a shovel. The uprights 24 are spaced apart a sufficient distance to accommodate between them the bolts, such as 25 for securing the plow blade in position. At the upper end these upright standards are spaced apart a sufficient distance to receive between them the beams 11. The standards extend a material distance beyond the upper edge of the beams. The pivot 23 is arranged at the center of curvature of the arcuate portion 14 of the beams so that the upright standards 24 may be swung in a vertical plane with the transverse pin 27 which joins them together in substantial engagement with the lower or inner edges of the beams throughout the full extent of the quadrant or as much thereof as is necessary to secure the various desired adjustments of the plow blade.

The adjusted position of the upright standards is maintained by means of the arcuate toothed adjusting member 28 formed of a strip of metal of a thickness to fit easily between the plow beams and having the upwardly offset end 29 which is adapted to fit between the upright standards and be secured thereto by the pivot 30. The lower edge of this arcuate member 28 is provided with the teeth 31, the spaces between which are adapted to fit over the pin or dowel 32 extending transversely between the beams 11 near the center of their arcuate portion. It will be clear that any desired angular adjustment of the upright standards 24 may be secured by lifting the arcuate members 28 to the position shown in dotted lines in Figure 2 and swinging these upright standards about their pivot 23 to the position desired when the member 28 can be lowered so that a pair of the teeth 31 thereon engage opposite sides of the dowel 32 and prevent any movement in either direction of these standards. The member 28 is of such a depth and the spaces between the teeth are so positioned that when this member is in its locking position its upper edge 33 is flush with the upper edges of the arcuate portions 14 of the beams. At the lower end this upper edge 33 is provided with a laterally extending flange 34 and projecting upwardly and rearwardly from this is the boss 35 transversely drilled as at 36.

To retain the member 28 in its locked position there is provided the locking ring 37 which comprises a rectangular block of metal having near the center thereof a rectangular opening of a width equivalent to slightly more than the total distance across the beams 11 and of a height equivalent to the height of the beams plus the thickness of the flange 34. It may be necessary to provide the enlargements 38 of this opening in order that the ring may pass over the riveted heads of the dowel 32. This locking ring is arranged to slide freely on the arcuate portion 14 of the beams and when in its lowermost position as shown in full lines in Figures 1 and 2 to retain the member 28 against being lifted or forced out of position so that its teeth become disengaged from the dowel. When in this position it is so retained by gravity so that the locking of the member 28 and thus of the upright standards, is entirely automatic. In order, however, that the member 28 may be lifted to the dotted line position as shown in Figure 2 the upper wall of this ring 37 is provided with a longitudinal slot 39 of a width sufficient to allow the passage therethrough of the member 28 forward of the flange 34 so that it will be clear that upon lifting of the ring to a position forward of the flange 34, the member 28 may be lifted to adjust the angle of the plow blade and upon the returning of the member 28 to engage with the dowel 32 the ring 37 will be allowed to drop to its lowermost position, stopped by means of the boss 35, to lock the member 28. As shown at 40 the ring 37 is provided with the rearwardly extending parallel spaced arms which are adapted to embrace the ends of the boss 35 and are drilled as at 41 with holes to register in alignment with the hole 36 in the boss 35 so that a cotter pin such as 42 or other securing device, such as a padlock, may be placed therethrough to positively lock the plow blade in adjusted position against tampering, it being noted, however, that there is no possibility of the adjustment changing during use, even if this added protection is not used.

To assure rigid and immovable fastening of the upright standards, the lower edge of the offset part 29 on the member 28 has the wedging cam faces 43 which engage between the upper edges of the beams 11 when the member 28 is lowered into locking position and securely wedge these beams between these cam faces and the uprights 24 as well as against the pin 27 to thus more securely clamp the upright standards in position. The part 28 and its associate parts is preferably cast from some malleable metal so that there is no possibility of it cracking during this clamping operation which may require that some considerable force be applied to the lower end of the member 28 to press it into position so that the locking ring can be slipped over the flange 34.

Having thus described my invention, what is claimed as new and desired to be secured by United States Letters Patent is:

1. In a plow, in combination, a beam, a quadrant shaped rear end thereon, a bar extending forward of the end from said quadrant, an upright pivoted at its lower end to said bar and adapted to carry a plow blade, and means conforming to the curvature of said quadrant pivoted to the opposite end of said upright and adapted to be adjustably engaged with a portion of said quadrant when the quadrant and the means are substantially concentric.

2. In a plow, in combination, a beam, a quadrant shaped rear end thereon, a bar rigidly secured to the bottom of said quadrant and extending substantially parallel to said beam, a blade-carrying upright pivoted at its lower end to said bar at the center of curvature of said quadrant and extending to said quadrant, a notched adjusting member pivoted to said upright, and a projection on said quadrant adapted to be engaged by said member.

3. In a plow, in combination, a beam having one end formed into a quadrant, a bar projecting from said beam to the center of curvature of said quadrant, a blade-carrying upright pivoted at one end to said bar at said center and extending radially beyond said quadrant, a pin projecting from said quadrant, and a notched adjusting member pivoted to said upright beyond said quadrant and adapted to be adjustably engaged over said pin to adjust the angle of said upright to said beam.

4. In a plow, in combination, a beam having one end formed into a quadrant, a bar projecting from said beam to the center of curvature of said quadrant, a blade-carrying upright pivoted at one end to said bar at said center and extending radially beyond said quadrant, a pin projecting from said quadrant, a notched adjusting member pivoted to said upright and adapted to engage said pin, and gravity controlled means to lock said adjusting member to said beam.

5. In a plow, in combination, a beam having one end formed into a quadrant, a bar projecting from said beam to the center of curvature of said quadrant, a blade-carrying upright pivoted at one end to said bar at said center and extending radially beyond said quadrant, a pin projecting from said quadrant an adjusting member pivoted to said upright and having notches any one of which may cooperate with said pin, and a ring slidable over said quadrant and adjusting member to lock said member in adjusted position.

6. In a plow, in combination, a beam having one end formed into a quadrant, a bar projecting from said beam to the center of curvature of said quadrant, a blade-carrying upright pivoted at one end to said bar at said center and extending radially beyond said quadrant, a pin projecting from said quadrant an adjusting member pivoted to said upright and having notches any one of which may cooperate with said pin, a projection on said upright engaging the inner surface of said quadrant, and a cam surface on said adjusting member adapted to clamp said quadrant between itself and said projection when the adjusting member engages over said pin on said quadrant.

7. In a plow, in combination, a pair of spaced parallel beams having their rear ends formed into quadrants, a bar projecting from the free ends of said quadrants to the center of curvature thereof, a blade-carrying upright pivoted to the bar at said center and passing by said beams, a notched adjusting member pivoted to said upright beyond said quadrants and offset to fit between them, a dowel between said quadrants adapted to cooperate with the walls of said notches to maintain said upright in adjusted position, a pin transversely extending from said upright and adapted to cooperate with the inner edges of said quadrants, a cam face on said adjusting member near its pivot adapted to clamp said quadrants between said cam and pin when said adjusting member is in operative position, a flange near the free end of said adjusting member, a ring slidable over said beams and flange and having an opening therein adapted to pass said adjusting member beyond said flange, and a projection on said flange to limit the movement of said ring.

8. In a plow, in combination, a pair of spaced parallel beams having their rear ends formed into quadrants a bar projecting from the free ends of said quadrants to the center of curvature thereof, a two armed blade-carrying upright pivoted to the bar at said center and passing outside said beams, a notched adjusting member pivoted to said upright beyond said quadrants and arranged to fit between them, a dowel between said quadrants adapted to cooperate with the walls of said notches to maintain said upright in adjusted position, a pin transversely extending from said upright and adapted to cooperate with the inner edges of said quadrants, a wedging cam face on said adjusting member near its pivot adapted to clamp said quadrants between said cam and pin and cam and uprights when said adjusting member is in operative position, a flange near the free end of said adjusting member, a ring slidable over said beams and flange and having an opening therein adapted to pass said adjusting member beyond said flange, and means to positively connect said ring and projection.

In testimony whereof I hereunto affix my signature.

ELBERT M. CHAPPELL.